Patented July 4, 1933

1,916,350

UNITED STATES PATENT OFFICE

BRUNO WENDT, HANS BINCER AND ALFRED FRÖHLICH, OF DESSAU IN ANHALT, GERMANY, ASSIGNORS TO AGFA ANSCO CORPORATION, OF BINGHAMTON, NEW YORK, A CORPORATION OF NEW YORK

MANUFACTURE OF COLOR-PICTURES

No Drawing. Application filed July 18, 1931, Serial No. 551,805, and in Germany August 13, 1930.

Our present invention relates to improved materials as used in the manufacture of color-pictures according to the bleaching out process.

One of its objects is to provide such a material of increased sensitiveness to light, simultaneously yielding pictures of better brightness.

A further object of our invention is a peculiar aftertreatment of the pictures obtainable with our new materials.

Additional objects may be seen from the detailed specification following hereafter.

This invention is based on the observation that for bleaching-out layers which contain besides basic dyes also acceptors or sensitizers, for instance, thiourea derivatives, the addition of substances of acid reaction is very favorable. The light-sensitiveness of the said layers is increased on account of the presence of substances of acid reaction, and the dyes bleach out without leaving any disturbing residue. The substances of acid reaction are either incorporated in the layer containing the bleaching-out dyes or both in the layer containing the bleaching-out dyes and a special colloid layer placed between the layer support and the light-sensitive layer.

Suitable additions are inorganic and organic acids, for instance, hydrochloric acid, cyanacetic acid, malonic acid, maleic acid, citric acid, malic acid, chlorpropionic acid, benzene-sulfonic acid, phthalic acid, complex acids, for instance, boric acid-mannite, acid-salts, for instance, sodium bisulfate, acid esters, such as glycerophosphoric acid, monomethyl ester of maleic acid, and substances splitting off acid by hydrolysis, for instance, betain hydrochloride. The colloid for the intremediate layer, if any, may be, for instance, gelatine, esters or ethers of carbohydrates, caoutchouc, polyglycuronic acid and the salts thereof, polyvinyl alcohol, natural and artificial resins. These colloids are dissolved in suitable solvents and spread on the layer support which may consist of simple or baryta paper.

In order to obtain pictures of a purer white and of an increased stability the substances of acid reaction must also be present in the finished bleaching-out picture. Since according to the usual fixing process for removing the acceptor or sensitizer from the layer also the substances of acid reaction are frequently washed out, it is advisable to after-treat the layer, after the fixing process, with a solution containing substances of acid reaction of the said groups.

The following examples illustrate the invention.

*Example 1*.—50 cc. of a 3% collodion solution, containing 8 milligrams of 2.7-dimethoxy-3.6-diamino-9.10-carbselenonium-chloride as a bleaching-out dye, 0,2 gram of maleic acid, 0,2 gram of malonic acid and 0,2 gram of diethyl-thiosinamine as a sensitizer, are poured on 400 square centimetres of baryta paper and dried. On exposing this paper under a grey scale, completely pure whites are obtained. The same layer without an addition of acid has a smaller bleaching-out velocity and does not yield pure whites.

*Example 2*.—A solution is prepared from a mixture of 25 cc. of a 5% solution of ethyl-benzyl cellulose in a mixture of equal parts of alcohol and benzene, 15 cc. of benzene, 10 cc. of a 10% collodion solution in a mixture of 3 parts of ether and 1 part of alcohol, 15 cc. of ether, 5 cc. of a 20% alcoholic solution of malic acid, 20 cc. of a 0.001 N-alcoholic solution of 2.7-dimethoxy-3-dimethylamino-6-amino-9.10-carbselenonium chloride 7.5" of a 0.002 N-alcoholic solution of Nile blue (Schultz "Farbstofftabellen", 6th edition, No. 653). 5.5" of a 0.04 N-alcoholic solution of resorcin-benzene-dimethylether bromide, 4" of a 10% alcoholic solution of diethyl-thiosinamine. The solution is poured on 1000 square centimeters of baryta paper and dried. The paper is then exposed to light under a colored diapositive and fixed in a mixture of 3 parts of benzine and 1 part of anisole. There is obtained a colored positive of the original with good whites. After fixing it is after treated in a solution of 3 parts of benzine and 1 part of anisole, which is saturated with malic acid and may also contain phosphotungstic acid, and dried.

If desired, there is applied between the layer support and the bleaching-out layer an intermediate layer of caoutchouc, which contains 25% of maleic acid.

Obviously our invention is not limited to the foregoing examples or to the specific details given therein. Thus, for instance, the layers may contain other basic dyes. From the great number of basic dyes which are well known in the art, we enumerate Flavinduline (Farbstofftabellen No. 668) Rosinduline (Farbstofftabellen No. 673), Capriblue GON (Farbstofftabellen No. 620), Methyleneblue (Farbstofftabellen No. 659), Pyronine G (Farbstofftabellen No. 568). Instead of diethyl-thiosinamine, allyl thiourea or other substitution products thereof may be used. Furthermore any other of the acid substances mentioned above may be applied to the light sensitive layer.

What we claim is:

1. The process which comprises incorporating into a light-sensitive layer containing a basic bleaching-out dye and a sensitizer a substance of acid reaction.

2. Light-sensitive photographic materials comprising a binding agent, a basic bleaching-out dye, a sensitizer and a substance of acid reaction.

3. Light-sensitive photographic materials comprising a binding agent and imbedded therein a basic bleaching-out dye, a sensitizer, and a substance of acid reaction.

4. Light-sensitive photographic materials comprising a binding agent and imbedded therein a basic bleaching-out dye, a substance of acid reaction, a sensitizer, and, imbedded into an intermediate layer, a further substance of acid reaction.

5. Photographic color pictures, wherein the picture is made up by a basic dye and which contains in the picture layer a substance of acid reaction.

In testimony whereof we affix our signatures.

BRUNO WENDT.
HANS BINCER.
ALFRED FRÖHLICH.